United States Patent [19]
Hanson et al.

[11] Patent Number: 5,133,214
[45] Date of Patent: Jul. 28, 1992

[54] ADJUSTMENT OF SCALE FACTOR LINEARITY IN A SERVO ACCELEROMETER

[75] Inventors: Richard A. Hanson; James R. Woodruff, both of Redmond, Wash.; Gerald R. Newell, Alamo, Calif.

[73] Assignee: New SD, Inc., San Francisco, Calif.

[21] Appl. No.: 526,559

[22] Filed: May 18, 1990

[51] Int. Cl.[5] .............................................. G01P 15/08
[52] U.S. Cl. .................................. 73/517 B; 73/517 R; 73/1 D
[58] Field of Search .................. 73/1 D, 517 B, 517 R

[56] References Cited

U.S. PATENT DOCUMENTS

| | | | |
|---|---|---|---|
| 4,088,026 | 5/1978 | Flanner | 73/516 R |
| 4,854,169 | 8/1989 | Sakuma et al. | 73/517 B |

*Primary Examiner*—Hezron E. Williams
*Assistant Examiner*—Craig Miller
*Attorney, Agent, or Firm*—Flehr, Hohbach, Test, Albritton & Herbert

[57] ABSTRACT

A method for post-production reduction of scale factor nonlinearities including testing of an assembled torque coil and magnetic circuit to determine nonlinearities. To reduce the scale factor nonlinearities, the position of a magnetic circuit component which intercepts the magnetic flux passing through a torque coil is changed. The position of the interior surface of a magnetic end cap is changed with respect to the position of the torque coil. The location of the interior surface of the end cap is varied by using an end cap having a plug portion which is selected to have an interior surface at a location which minimizes scale factor nonlinearities.

An force-balance accelerometer has an improved magnetic circuit for reducing nonlinear scale factors. The magnetic circuit which provides a return path for magnetic flux from a permanent magnet source includes an end cap having an interior surface which is located at an optimum distance from the torque coil of the accelerometer to minimize scale factor distortion. The end cap includes a plug member having a predetermined reference surface for engagement with a reference surface in the end cap to locate the interior surface of the plug at an optimum position.

14 Claims, 1 Drawing Sheet

ADJUSTMENT OF SCALE FACTOR LINEARITY IN A SERVO ACCELEROMETER

BACKGROUND OF THE INVENTION

1. Field of the Invention

This invention relates to magnetic circuits for accelerometers and, more particularly, to a method for improving the scale factor linearity of a servo accelerometer.

2. Prior Art

A servo accelerometer is, in effect, an electromagnetically operated servo motor which includes a force restoring element or force balancing element, a coil of wire in a pendulous device called a torque coil, which is immersed in a magnetic field. The torque coil is fixed to a moving element, or so-called sensing element, which responds to external acceleration forces applied to the accelerometer. The accelerometer has a magnetic circuit which includes elements such as a permanent magnet source and other magnetic circuit components which serve as pole pieces or which provide a return path for the magnetic flux in the circuit. The torque coil is immersed in the magnetic field provided by the permanent magnet. Current through the torque coil interacts with the magnetic field of the permanent magnet, producing a force on the torque coil. The deviation of the flexure element from a neutral position is sensed by a pickoff device and a current proportional to the deviation is produced by an external circuit. The current is set to provide a force which balances those forces on the moving element of the accelerometer caused by acceleration. Consequently, the current through the torque coil is very nearly proportional to the force on the sending element and to the acceleration to be measured. The current through the torque coil is easily converted to a suitable signal indicating the magnitude of the acceleration. A servo accelerometer of this type is disclosed in the Woodruff U.S. Pat. No. 4,779,463, issued to the assignee of the instant invention.

Use of this type of accelerometer is not without problems. In this type of accelerometer, the force caused by the current in the torque coil is proportional to the cross product of the current through the coil and a magnetic field. The magnetic field is produced by combining two magnetic fields: One field is the permanent magnet field. The other field is the magnetic field caused by the current through the torque coil. The magnetic field produced by the current in the torque coil is a nonlinear function of the current in the torque coil because the field produced by the coil current interacts with the field from the magnet and magnetic return path in a nonlinear way. This results in the current through the torque coil being a nonlinear function of the acceleration being measured.

It is possible to produce a design for an accelerometer which theoretically has a nearly linear scale factor. However, production variations normally result in small amounts of nonlinearity. For certain applications, such as inertial navigation, it is desirable to reduce these small nonlinearities even further to meet certain critical precise performance specifications.

SUMMARY OF THE INVENTION

It is therefore an object of the invention to provide a post-first functional test method of reducing nonlinearities in the scale factor of a servo accelerometer after manufacture of the moving element with its suspension system and after assembly of the elements into the magnetic circuit.

In accordance with this and other objects of the invention, a post-assembly method is provided for reducing scale factor nonlinearity, which is produced by nonlinearities of the permanent magnet in combination with a torque coil circuit of a servo accelerometer. This is accomplished by first testing an assembled accelerometer and then determining any nonlinear scale factor terms that are caused by production tolerances and other causes. Nonlinear terms are reduced by changing the relative size of a magnetic circuit component. This is done by repositioning the surface of an end plug of the magnetic circuit which has a surface near the pole piece for the torque coil. The magnetic circuit is adjusted by replacing a plug at the end of the servo motor with another plug having a surface nearest the torque coil positioned at a different distance with respect to the torque coil.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
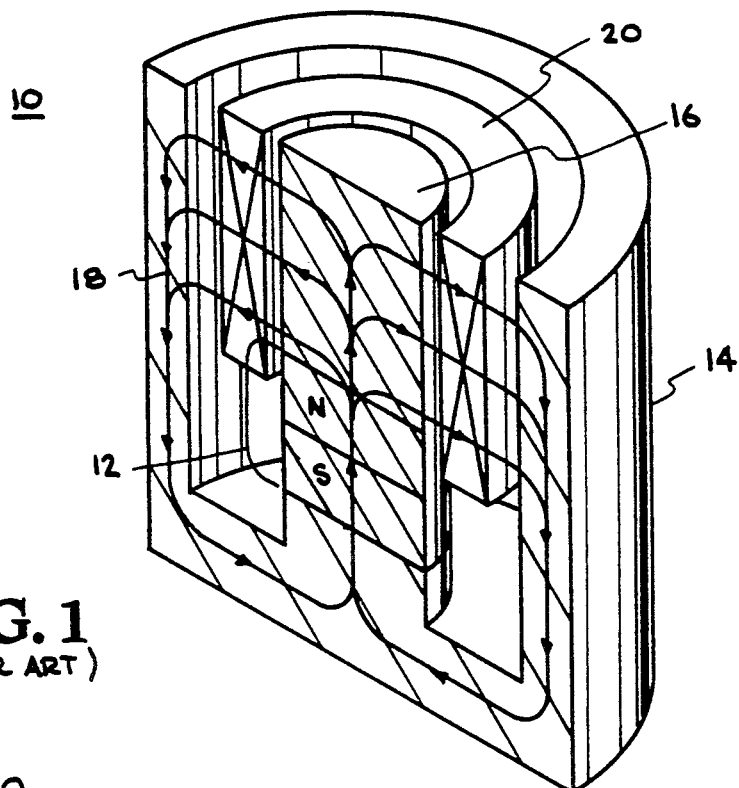
FIG. 1 is an isometric sectional view of a prior art servo accelerometer showing the path of the magnetic field produced by the permanent magnet.

FIG. 1 shows a prior art servo accelerometer 10 which includes a permanent magnet 12 mounted along the axis of a cylindrically-shaped cup 14. The magnetic flux provided by the permanent magnet 12 passes through a pole piece 16 positioned along the axis on top of the permanent magnet 12. The cup 14 is formed of magnetic material and provides a return path for the magnetic flux generated by the permanent magnet, as indicated by the flux lines typically shown by the lines 18. The flux lines radiate from the pole piece and pass through a torque coil 20, which is coaxial with the pole piece, and return to the permanent magnet through the cup 14, as shown.

The torque coil 20 is fixed to a moveable, acceleration-responsive element, sometimes called a sensing element or proof-mass (not shown) as is known in this art. The torque coil 20 is formed by a number of conductive, concentric turns lying in planes generally perpendicular to the sensing axis of the device. The torque coil moves up and down in a axial direction and has concentric air gaps respectively between the exterior cylindrical surface of the pole piece 16 and the interior cylindrical surface of the cup 14. A current is generated, in response to movement of the suspension from a rest position, and is passed through the torque coil. This current works with the magnetic field generated by the permanent magnet to provide a restoring force on the torque coil 20 which causes the flexure to return to its rest position. Thus, the current through the torque coil 20 is very nearly proportional to the acceleration on the device. As mentioned hereinabove the current through the torque coil 20 also produces a magnetic field which combines with the magnetic field of the permanent magnet. The restoring force produced by the torque coil current interacting with that part of the magnetic field caused by magnetization of the elements of the magnetic circuit is a force which is not exactly a linear function of the torque coil current. Consequently, the torque coil current is not an exact linear function of the acceleration to be measured. It is desirable that the scale factor, which relates the current in the torque coil to the acceleration force, be linear. It is possible that an accelerometer can be designed which is nominally linear. However, due to production variations, the scale factor still has some non-linearities which it is desired to reduce.

Figure 2:
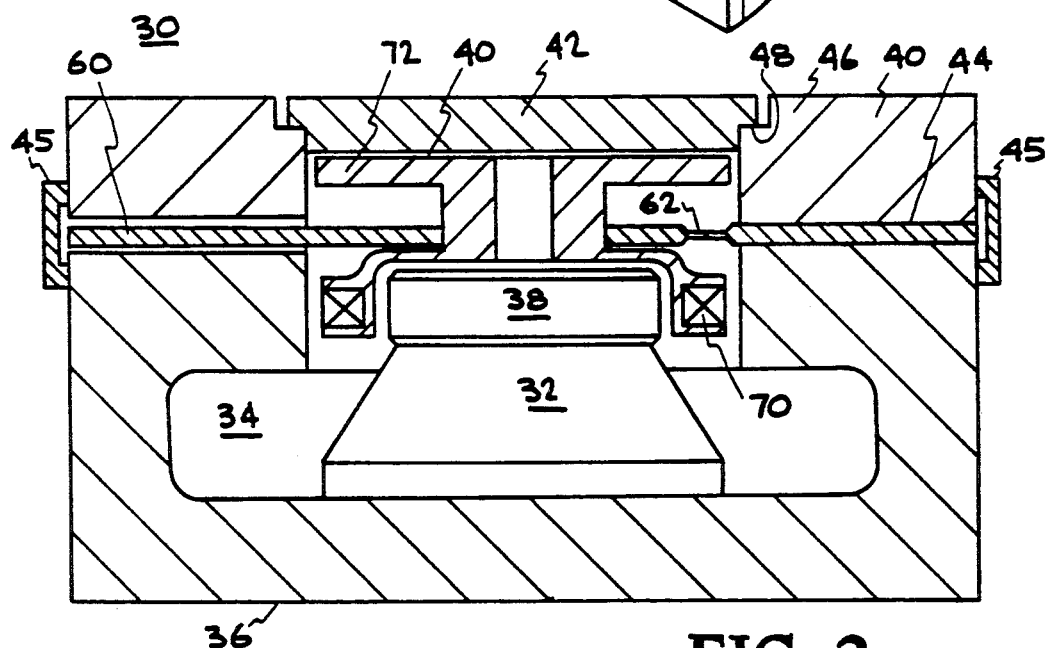
FIG. 2 is a cross-sectional view of a servo accelerometer having a magnetic circuit with a cap having a replaceable plug according to the invention.

FIG. 2 shows a cylindrically-symmetric force-balance accelerometer 30 for practicing the invention. A permanent magnet 32 is formed as a section of a truncated cone and lies within a cavity formed within the interior of a cup-shaped member 36. The permanent magnet 32 has its bottom face fixed to the interior surface of the bottom of the cup-shaped member 36. The cup 36 is formed of magnetic material and provides a return path for the magnetic flux provided by the magnet 32. The magnetic flux from the permanent magnet 32 passes through a cylindrically-shaped pole piece 38, which has one end surface fixed to the top face of the permanent magnet 32. The cup-shaped member 36 interfaces with a top cover assembly, which includes a cover ring or end cap portion 40 with a removable plug member 42. The cover ring portion 40 is formed of magnetic material as an annular ring. The cover ring 40 does not directly contact the cup 36. A non-magnetic spacer 44 is positioned between portions of the top surface of the cup 36 and the bottom surface of the cover ring 40. A clamp 45 formed of magnetic material holds the cup member 36 and the cover ring 40 together.

The cover ring 40 includes an interior stepped portion 46 formed adjacent to a large central aperture formed through the ring. The recessed portion includes a horizontal interior surface 48 which engages a corresponding horizontal reference surface 50 formed beneath a lip 52 formed in the peripheral edge of the removable plug member 42.

Figure 3:
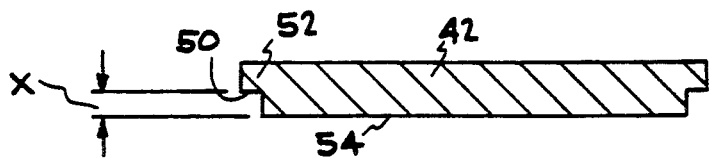
FIG. 3 is a cross-sectional view of a replaceable plug showing the dimension x which is varied to improve scale factor linearity in a servo accelerometer according to the invention.

FIG. 3 shows the plug 42, which is formed as a disk of magnetic material. Dimension x controls the spacing between the reference surface 50 and the inner surface 54 of the plug 42. The distance between the inner surface 54 of the plug 42 and the pole piece 38 is varied by varying the dimension x.

Referring to FIG. 2, a pendulum, or pendulous element, 60 is provided which moves in response to acceleration forces imposed on the accelerometer. The pendulum 60 is suspended from the base provided by the cup member 36 by a flexible element 62 which is connected to the spacer 44.

A torque coil 70 is fixed to the pendulum 60 as shown. A non-magnetic counter-balance element 72 is fixed to the pendulum opposite the torque coil 70. The torque coil is formed of circular turns of wire and has an axis which is aligned generally parallel to the direction of the flux from the pole piece 38. The torque coil 70 intercepts the magnetic flux from the pole piece 38. A pickup device senses the position of the pendulum 60 and generates a balancing current which is passed through the torque coil 70 and which interacts with the magnetic flux through the torque coil to generate a balancing force which is substantially equal and opposite to the acceleration force. This balancing force positions the pendulum substantially at its rest position. The balancing current provides a measure of the magnitude of the accelerating force.

Nonlinearities in the scale factor relating the balancing current to the acceleration are minimized after assembly of the torque coil with its suspension and of the various elements of the magnetic circuit by the following steps: The accelerometer is tested and the degree of scale factor non-linearity is determined. The strength of the magnetic flux is modified slightly by changing the length of the air gap between the pole piece and the end cap. This is done by changing the position of the interior surface of the end cap with respect to the pole piece. By replacing one end cap with another having a different dimension x, the position of the interior surface is modified. This process can be repeated if necessary to reduce the nonlinearity to a very small value. Once the necessary value is achieved the end cap 42 is permanently secured to cover ring 40.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A post-functional test assembly method of reducing scale factor nonlinearity of a servo accelerometer, wherein said accelerometer includes a torque coil attached to a suspended moving element of said accelerometer and wherein said accelerometer includes a magnetic circuit, a permanent magnet, and a pole piece and magnetic circuit components which provide a magnetic return path for the magnetic field generated by said permanent magnet, comprising the steps of:

testing the assembly of said torque coil and said magnetic circuit components for linearity;
determining any nonlinear scale factor terms;
changing the position of an end cap for said magnetic circuit with respect to said pole piece to minimize said nonlinear scale factor term.

2. The method of claim 1 wherein the step of changing the position of a cap for said magnetic circuit includes the step of changing the location of an interior surface of said end cap with respect to said pole piece.

3. The method of claim 2 wherein the step of changing the position of the magnetic circuit component includes the step of replacing a pug in said end cap with another plug having a surface which has a different location with respect to said pole piece.

4. A force-balance servo accelerometer, including:

a source of magnetic flux;

a magnetic circuit including magnetic material and an air gap for returning said magnetic flux to said source;

a pendulous element moveable in response to an acceleration force on said accelerometer;

suspension means for suspending said pendulous element on said servo accelerometer;

a torque coil fixed to said pendulous element, wherein said torque coil intercepts said magnetic flux and is adapted to carry a balancing current which interacts with said magnetic flux to generate a force which is substantially equal and opposite to said acceleration force to thereby balance said acceleration force on said pendulous element, with said balancing current providing an indication of the magnitude of said acceleration force; and an end cap forming part of said magnetic circuit having a replaceable plug formed of magnetic material for setting the length of the air gap and thereby adjusting the strength of the magnetic field to provide a linear relationship between the acceleration force and the current in the torque coil.

5. The force-balance accelerometer of claim 4 wherein said magnetic circuit includes a cup surrounding said torque coil and wherein said end cap is coupled to said cup to form a closed magnetic circuit for said magnetic flux.

6. The force-balance accelerometer of claim 5 wherein said cup includes an interior recessed lip portion which engages a corresponding portion of said end cap.

7. The force-balance accelerometer of claim 6 wherein said interior recessed lip portion of said cup includes a reference surface which is generally perpendicular to said magnetic flux;

said end cap includes an air gap surface which forms one boundary of the air gap and a reference surface which is located a predetermined distance from the air gap surface; and said reference surfaces are engageable with each other to space said air gap surface a predetermined distance from said torque coil.

8. The force-balance accelerometer of claim 4 including a pole piece for directing magnetic flux through said torque coil.

9. The force-balance accelerometer of claim 4 wherein said torque is a circular coil.

10. The force-balance accelerometer of claim 4 wherein said source of magnetic flux includes a permanent magnet.

11. In a force-balancing servo accelerometer: a source of magnetic flux, a magnetic circuit which carries the magnetic flux to provide a magnetic field, a torque coil which moves in the magnetic field in response to acceleration to produce a balancing current which works with the magnetic field to provide a restoring force which opposes the movement of the coil, and means in the magnetic circuit for adjusting the strength of the magnetic field to provide a linear relationship between acceleration and the current produced in the coil.

12. The accelerometer of claim 11 wherein the magnetic circuit comprises a cup surrounding the torque coil, a pole piece disposed coaxially within the cup, an end cap coupled to the cup, and a replaceable plug in the end cap for adjusting the length of an air gap between the pole piece and the replaceable plug.

13. In a method of reducing scale factor nonlinearity in a force-balancing servo accelerometer having a source of magnetic flux, a magnetic circuit which carries the magnetic flux to provide a magnetic field, and a torque coil which moves in the magnetic field in response to acceleration to produce a balancing current which works with the magnetic field to provide a restoring force which opposes the movement of the coil, the steps of: testing the accelerometer for linearity between acceleration and the current produced in the torque coil, and adjusting the magnetic circuit to adjust the strength of the magnetic field to provide a linear relationship between acceleration and the current produced in the coil.

14. The method of claim 13 wherein the magnetic circuit is adjusted by replacing a plug spaced from a pole piece with a plug of a different length to change the length of an air gap between the plug and the pole piece.

* * * * *